(12) United States Patent
Wang et al.

(10) Patent No.: US 9,973,917 B2
(45) Date of Patent: May 15, 2018

(54) TRANSMISSION METHOD AND USER EQUIPMENT

(71) Applicant: Huawei Device (Dongguan) Co., Ltd., Dongguan (CN)

(72) Inventors: Jian Wang, Shenzhen (CN); Kai Xu, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 118 days.

(21) Appl. No.: 15/114,249

(22) PCT Filed: Jan. 26, 2014

(86) PCT No.: PCT/CN2014/071473
§ 371 (c)(1),
(2) Date: Jul. 26, 2016

(87) PCT Pub. No.: WO2015/109563
PCT Pub. Date: Jul. 30, 2015

(65) Prior Publication Data
US 2017/0013438 A1     Jan. 12, 2017

(51) Int. Cl.
*H04W 4/00* (2018.01)
*H04W 8/00* (2009.01)
(Continued)

(52) U.S. Cl.
CPC ............. *H04W 8/005* (2013.01); *H04L 1/00* (2013.01); *H04L 1/1819* (2013.01);
(Continued)

(58) Field of Classification Search
CPC ...... H04W 8/005; H04W 76/023; H04L 1/00; H04L 1/1819; H04L 5/0044; H04L 5/0053
(Continued)

(56) References Cited

U.S. PATENT DOCUMENTS

| | | | | |
|---|---|---|---|---|
| 2011/0002290 A1* | 1/2011 | Kim | ............... | H04L 1/0026 370/329 |
| 2012/0176957 A1* | 7/2012 | Chen | ............... | H04B 7/155 370/315 |

(Continued)

FOREIGN PATENT DOCUMENTS

| | | |
|---|---|---|
| CN | 102281646 A | 12/2011 |
| CN | 103326756 A | 9/2013 |
| CN | 103378936 A | 10/2013 |

OTHER PUBLICATIONS

Intel Corporation, "D2D Discovery Resource Size and Mapping to Physical Resources," 3GPP TSG RAN WG1 Meeting #75, R1-135827, San Francisco, USA, Nov. 11-15, 2013, pp. 1-9.
(Continued)

*Primary Examiner* — Sai Ming Chan
(74) *Attorney, Agent, or Firm* — Slater Matsil, LLP (57) ABSTRACT

A method includes: determining, by user equipment UE, a first discovery signal, and obtaining, by the UE after encoding the first discovery signal, respective initial locations of k redundancy versions RVs of the first discovery signal, where k is a positive integer not less than 1. The method also includes separately mapping, by the UE according to respective initial locations off RVs of the k RVs, each RV of the f RVs to at least two physical resource block pairs PRB Pairs of a first resource location, where f is a positive integer not less than 1 and not greater than k. The method also includes transmitting, by the UE at the first resource location, the f RVs of the first discovery signal.

16 Claims, 7 Drawing Sheets

(51) Int. Cl.
H04L 1/00 (2006.01)
H04L 1/18 (2006.01)
H04L 5/00 (2006.01)
H04W 76/02 (2009.01)

(52) U.S. Cl.
CPC .......... H04L 5/0044 (2013.01); H04L 5/0053 (2013.01); H04W 76/023 (2013.01); *H04L 5/0094* (2013.01)

(58) Field of Classification Search
USPC .......................................... 370/329
See application file for complete search history.

(56) References Cited

U.S. PATENT DOCUMENTS

| 2015/0124746 A1* | 5/2015 | Wu | H04W 74/0833 370/329 |
|---|---|---|---|
| 2015/0201406 A1* | 7/2015 | Zhang | H04W 76/023 370/330 |
| 2015/0280876 A1* | 10/2015 | You | H04L 5/0048 370/329 |

OTHER PUBLICATIONS

NTT Docomo, Inc., "Evaluation of D2D Discovery Message and Transmission for Type 1 Discovery," 3GPP TSG RAN WG1 Meeting #75, R1-135521, San Francisco, USA, Nov. 11-15, 2013, pp. 1-5.

Alcatel-Lucent Shanghai Bell et al., "D2D Discovery Signal Design", 3GPP TSG RAN WG1 Meeting #74bis, R1-134231, Oct. 7-11, 2013, pp. 1-7, Guangzhou, China.

Alcatel-Lucent Shanghai Bell, et al., "Discovery Signal Design Details," 3GPP TSG RAN WG1 Meeting #75, R1-135177, Nov. 11-15, 2013, pp. 1-6, San Francisco, USA.

* cited by examiner

―Time (subframe)►

| PRB 1, subframe 1 | PRB 1, subframe 2 | ... | ... | ... | ... | ... | PRB 1, subframe 8 |
|---|---|---|---|---|---|---|---|
| PRB 2, subframe 1 | ... | ... | ... | ... | ... | ... | ... |
| PRB 3, subframe 1 | ... | ... | ... | ... | ... | ... | ... |
| PRB 4, subframe 1 | PRB 4, subframe 2 | ... | ... | ... | ... | ... | PRB 4, subframe 8 |

←Frequency (PRB)→

FIG. 7

―Time (subframe)►

| PRB 1, subframe 1 | PRB 1, subframe 2 | ... | ... | ... | ... | ... | PRB 1, subframe 8 |
|---|---|---|---|---|---|---|---|
| PRB 2, subframe 1 | ... | ... | ... | ... | ... | ... | ... |
| PRB 3, subframe 1 | ... | ... | ... | ... | ... | ... | PRB 3, subframe 8 |
| PRB 4, subframe 1 | PRB 4, subframe 2 | ... | ... | ... | ... | ... | PRB 4, subframe 8 |

←Frequency (PRB)→

TRANSMISSION METHOD AND USER EQUIPMENT

CROSS-REFERENCE TO RELATED APPLICATIONS

This patent application is a national phase filing under section 371 of PCT/CN2014/071473, filed on Jan. 26, 2014, entitled "TRANSMISSION METHOD AND USER EQUIPMENT", which is incorporated herein by reference in its entirety.

TECHNICAL FIELD

The present invention relates to the field of communications, and in particular, to a transmission method and user equipment.

BACKGROUND

With development of communications technologies, the proximity service between user equipment and user equipment (Device to Device Proximity Service; D2D ProSe) has become a research subject of the Release 12 (Rel.12) system of the 3rd Generation Partnership Project (3GPP) Long Term Evolution (LTE) system and is supported since the Rel.12 system.

In a process of studying a physical layer of the D2D ProSe, sending of a discovery signal and receiving of the discovery signal are involved. Currently, each redundancy version (RV) of the discovery signal can be transmitted on only one physical resource block pair (PRB Pair). If a transmitted coded bit of one RV of the discovery signal needs to occupy more than one PRB Pair, an area of all coded bits still cannot be covered even when all RVs of the discovery signal are transmitted, which causes deterioration of encoding and decoding performance.

SUMMARY

Embodiments of the present invention provide a transmission method and user equipment, which can improve encoding and decoding performance of a discovery signal.

To achieve the foregoing objective, the embodiments of the present invention use the following technical solutions.

According to a first aspect, a transmission method is provided. The method includes: determining, by user equipment UE, a first discovery signal. The method also includes obtaining, by the UE after encoding the first discovery signal, respective initial locations of k redundancy versions RVs of the first discovery signal, where k is a positive integer not less than 1. The method also includes separately mapping, by the UE according to respective initial locations off RVs of the k RVs, each RV of the k RVs to at least two physical resource block pairs PRB Pairs of a first resource location, where f is a positive integer not less than 1 and not greater than k; and transmitting, by the UE at the first resource location, the f RVs of the first discovery signal.

With reference to the first aspect, in a first possible implementation manner of the first aspect, the determining, by UE, a first discovery signal includes: determining, by the UE, a length of the first discovery signal; determining, by the UE according to the length of the first discovery signal, that any RV of the first discovery signal occupies n PRB Pairs, where n is a positive integer not less than 2; and configuring, by the UE, first indication information in the first discovery signal, where the first indication information is used to indicate a quantity j of PRB Pairs occupied by the first discovery signal, j is equal to a value obtained by multiplying n by f, and f is a quantity of RVs sent by the UE in the first resource.

With reference to the first aspect or the first possible implementation manner of the first aspect, in a second possible implementation manner of the first aspect, the first resource location is one of h resource locations including j PRB Pairs and m subframes, where m is a positive integer not less than 1, j is a positive integer greater than 1, j≥m, h is a positive integer greater than 1, and the h resource locations do not overlap.

With reference to the second possible implementation manner of the first aspect, in a third possible implementation manner of the first aspect, in the h resource locations, a number of the first PRB Pair at the latter resource location of adjacent resource locations is 1 plus a number of the last PRB pair at the former resource location, a sequence of the h resource locations is determined first according to a frequency domain and then according to a time domain, and numbers of PRB Pairs at each resource location are successive.

With reference to the second possible implementation manner of the first aspect, in a fourth possible implementation manner of the first aspect, in the h resource locations, a number of the first PRB Pair at the latter resource location of adjacent resource locations is 1 plus a number of the last PRB pair at the former resource location, a sequence of the h resource locations is determined first according to a time domain and then according to a frequency domain, and numbers of PRB Pairs at each resource location are successive.

With reference to the first aspect to the fourth possible implementation manner of the first aspect, in a fifth possible implementation manner of the first aspect, the separately mapping, by the UE according to respective initial locations off RVs of the k RVs, each RV of the f RVs to at least two physical resource block pairs PRB Pairs of a first resource location includes: separately mapping, by the UE according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a frequency domain and then according to a time domain.

With reference to the first aspect to the fourth possible implementation manner of the first aspect, in a sixth possible implementation manner of the first aspect, the separately mapping, by the UE according to respective initial locations off RVs of the k RVs, each RV of the f RVs to at least two physical resource block pairs PRB Pairs of a first resource location is specifically: separately mapping, by the UE according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a time domain and then according to a frequency domain.

According to a second aspect, user equipment UE is provided. The UE includes a determining unit, an encoding unit, a mapping unit, and a transmission unit. The determining unit is configured to determine a first discovery signal. The encoding unit is configured to encode the first discovery signal determined by the determining unit, so as to obtain respective initial locations of k redundancy versions RVs of the first discovery signal, where k is a positive integer not less than 1. The mapping unit is configured to separately map, according to respective initial locations off RVs of the k RVs that are obtained by the encoding unit, each RV of the f RVs to at least two physical resource block pairs PRB Pairs of a first resource location, where f is a positive integer not less than 1 and not greater than k. The transmission unit is configured to transmit, at the first resource location, the f RVs of the first discovery signal.

With reference to the second aspect, in a first possible implementation manner of the second aspect, the determining unit is specifically configured to: determine a length of the first discovery signal; determine, according to the length of the first discovery signal, that any RV of the first discovery signal occupies n PRB Pairs, where n is a positive integer not less than 2; and configure first indication information in the first discovery signal, where the first indication information is used to indicate a quantity j of PRB Pairs occupied by the first discovery signal, j is equal to a value obtained by multiplying n by f, and f is a quantity of RVs sent by the UE in the first resource.

With reference to the second aspect or the first possible implementation manner of the second aspect, in a second possible implementation manner of the second aspect, the first resource location is one of h resource locations including j PRB Pairs and m subframes, where m is a positive integer not less than 1, j is a positive integer greater than 1, j≥m, h is a positive integer greater than 1, and the h resource locations do not overlap.

With reference to the second possible implementation manner of the second aspect, in a third possible implementation manner of the second aspect, in the h resource locations, a number of the first PRB Pair at the latter resource location of adjacent resource locations is 1 plus a number of the last PRB pair at the former resource location, a sequence of the h resource locations is determined first according to a frequency domain and then according to a time domain, and numbers of PRB Pairs at each resource location are successive.

With reference to the second possible implementation manner of the second aspect, in a fourth possible implementation manner of the second aspect, in the h resource locations, a number of the first PRB Pair at the latter resource location of adjacent resource locations is 1 plus a number of the last PRB pair at the former resource location, a sequence of the h resource locations is determined first according to a time domain and then according to a frequency domain, and numbers of PRB Pairs at each resource location are successive.

With reference to the second aspect to the fourth possible implementation manner of the second aspect, in a fifth possible implementation manner of the second aspect, the mapping unit is specifically configured to: separately map, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a frequency domain and then according to a time domain.

With reference to the second aspect to the fourth possible implementation manner of the second aspect, in a sixth possible implementation manner of the second aspect, the mapping unit is specifically configured to: separately map, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a time domain and then according to a frequency domain.

According to a third aspect, user equipment UE is provided. The UE includes a processor, a transceiver, a memory, and a communications bus, where the communications bus is configured for connection and communication among the processor, the transceiver, and the memory; the transceiver is configured for communication between the UE and the outside; and the processor is configured to invoke program code stored in the memory to perform the method according to any one of the first aspect.

The transmission method and the user equipment provided by the embodiments of the present invention provide can solve a problem in the prior art that encoding performance deteriorates because each RV can be transmitted on only one PRB Pair, and improve the encoding performance.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

For clarity and brevity of description of the following embodiments, several brief introductions are provided first.

Figure 1:
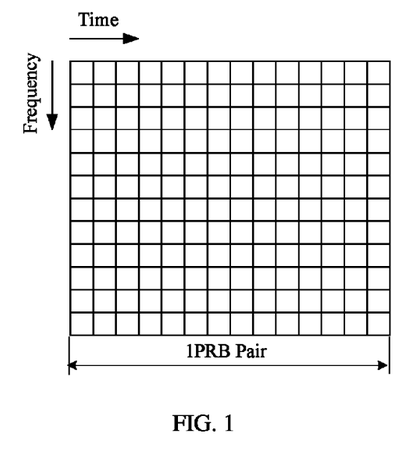
FIG. 1 is a schematic diagram of composition of a PRB Pair according to an embodiment of the present invention.

First, data bits that are of a discovery signal and that can be transmitted on one PRB Pair are as follows:

As shown in FIG. 1, FIG. 1 is a schematic diagram of one PRB Pair. Each small grid is one resource element (RE). One PRB Pair includes 12 subcarriers in a frequency domain, where each subcarrier can carry 2-bit data information. One PRB pair includes 14 or 12 symbols in a time domain, where 1-bit data information can be transmitted on each symbol, and two symbols are used to transmit a reference signal. It can be learned from the above that 12*2*(14−2)=288-bit or 12*2*(12−2)=240 data information can further be transmitted on one PRB Pair.

Second, a brief introduction to RV (Redundancy Version) is as follows.

The RV is designed for implementing transmission of an incremental redundancy (IR) hybrid automatic repeat request (HARQ), that is, dividing a redundancy bit generated by an encoder into several groups. Each RV has an initial location (also referred to as a transmission start point). Different RVs are used at the first time of transfer and each time of HARQ retransmission, so as to implement gradual accumulation of redundancy bits and complete an IR HARQ operation. In a research process of Long Term Evolution (LTE), two quantities of RVs were once taken into account: 4 and 8. After discussion, it is determined to use four RVs. A definition of the RV is related to a size of a software buffer. The smaller of a circular buffer at a transmit end and a software buffer at a receive end is selected, and the four RVs are evenly distributed in this scope.

Figure 2:
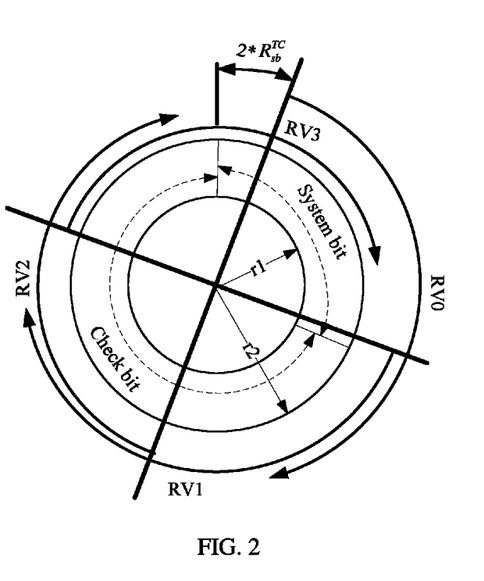
FIG. 2 is a schematic diagram of an RV of a transmission block according to an embodiment of the present invention.

FIG. 2 is a schematic diagram of an RV of a transmission block. An annulus formed by a circumference with a radius of r1 and a circumference with a radius of r2 is filled by two parts, where one part is a system bit, and the other part is a check bit. During encoding, one information bit generates two check bits, and therefore, System bit:Check bit=1:2. When an RV is an RV0 (it is assumed that the transmission is the first time of transmission), a relatively large quantity of system bits are transmitted. After a receive end fails in this time of decoding, the receive end instructs a transmit end to perform the first time of retransmission (it is assumed that the RV is an RV1), and in this way, more new redundancy bits are transmitted. The receive end does not discard data during a decoding failure at a previous time, but performs further decoding with reference to a retransmitted new redundancy bit. If an error still occurs, the receive end continues to instruct the transmit end to perform the second time of retransmission (it is assumed that the RV is an RV2), and more new redundancy bits are transferred. Likewise, if an error still occurs, the receive end continues to instruct the transmit end to perform the third time of retransmission (it is assumed that the RV is an RV3), and more new redundancy bits are transferred. More retransmission times indicate a lower code rate obtained after the receive end performs combination and a higher probability that decoding is correct, until the receive end performs correct decoding and instructs the transmit end to send new data, where $$2 * R_{sb}^{TC}$$

represents an offset of a sent system bit when the RV0 is sent, that is, a system bit that is sent in the RV0 and starts from the $$(2 * R_{sb}^{TC})^{th} \text{ bit,}$$

but not from the first bit.

It is assumed that each RV may be transmitted on one PRB Pair. As shown in Table 1, Table 1 shows four PRB Pairs in four subframes, where each small grid represents one PRB Pair in one subframe.

TABLE 1

| RV0 | RV1 | RV2 | RV3 |
| --- | --- | --- | --- |

Figure 3:
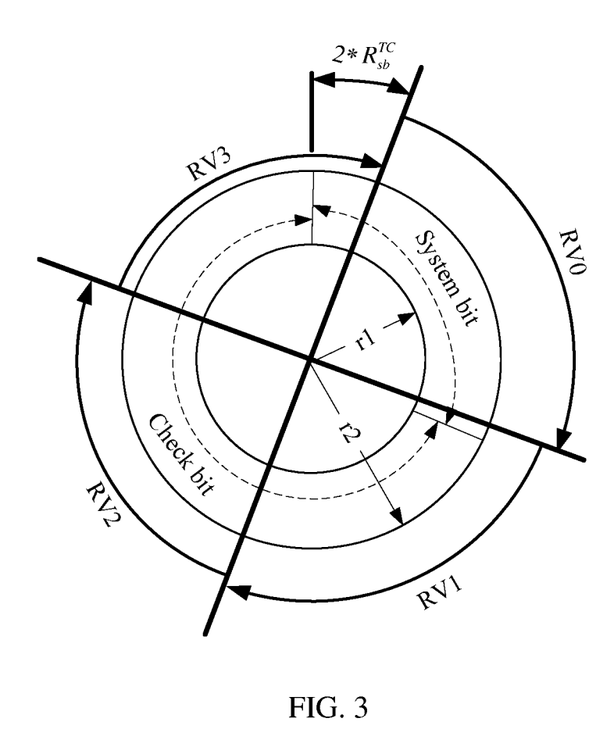
FIG. 3 is a diagram of RV transmission coverage in a case according to an embodiment of the present invention.
Figure 4:
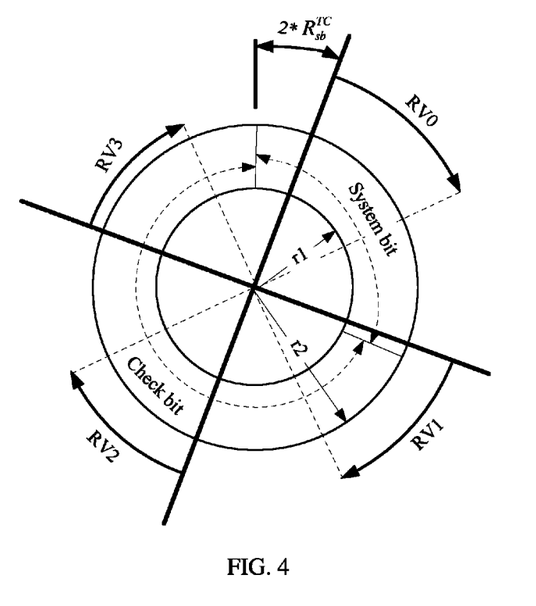
FIG. 4 is a diagram of RV transmission coverage in another case according to an embodiment of the present invention.

If a sent discovery signal needs to occupy four PRB Pairs, that is, four different versions of an encoded signal are sent in the four PRB Pairs, according to Table 1, coverage status shown in FIG. 3 is obtained. That is, all coded bits can be exactly transmitted through four PRB Pairs in four subframes. If a sent discovery signal needs to occupy eight PRB Pairs, and according to Table 1, each RV can be transmitted on one PRB in one subframe, coverage status shown in FIG. 4 is obtained. That is, only half of coded bits of each RV can be transmitted through one PRB in one subframe. It can be learned from the above that encoding and decoding performance may deteriorate if a transmitted coded bit of one RV needs to occupy more than one PRB Pair.

Embodiment 1

Figure 5:
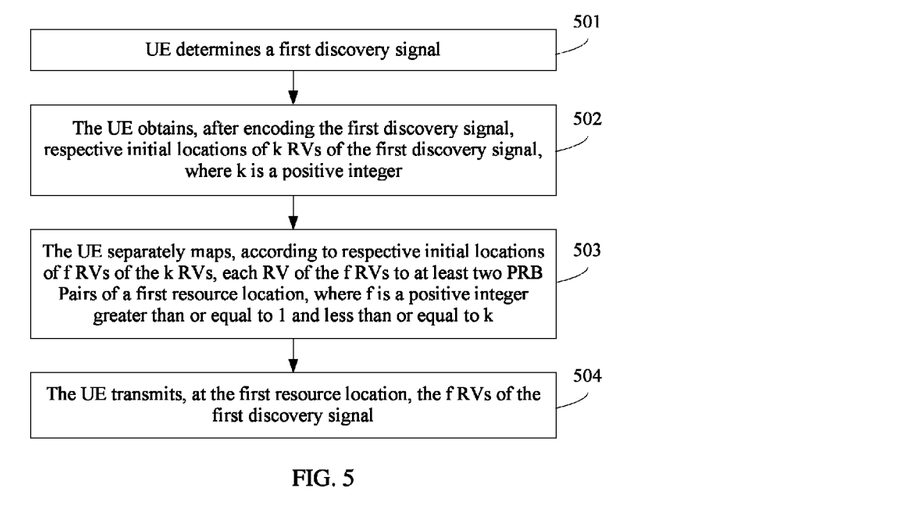
FIG. 5 is a schematic flowchart of a transmission method according to an embodiment of the present invention.

This embodiment of the present invention provides a transmission method. The method is applied in user equipment (UE). Specifically, as shown in FIG. 5, includes the following steps.

501. The UE determines a first discovery signal.

Specifically, in this embodiment of the present invention, the UE first determines the first discovery signal when transmitting a discovery signal.

The UE is UE that can send a discovery signal in a D2D ProSe process.

Specifically, that the UE determines a first discovery signal includes: the UE determines a length of the first discovery signal; the UE determines, according to the length of the first discovery signal, that any RV of the first discovery signal occupies n PRB Pairs, where n is a positive integer not less than 2; and the UE configures first indication information in the first discovery signal, where the first indication information is used to indicate a quantity j of PRB Pairs occupied by the first discovery signal, j is equal to a value obtained by multiplying n by f, and f is a quantity of RVs sent by the UE in a first resource.

It should be noted that the UE may construct a first discovery signal. For example, the UE may construct, according to a service that can be provided by the UE, a first discovery signal that needs to be sent. The first discovery signal can carry information about the service provided by the UE. After the UE completes constructing the first discovery signal, a length of the first discovery signal is also determined, and the length of the first discovery signal is also determined. The UE may determine the length. The length of the first discovery signal may be a length of the first discovery signal before the first discovery signal is encoded, or may be a length of the first discovery signal after the first discovery signal is encoded, or may be a length of the first discovery signal after the first discovery signal is encoded. This embodiment of the present invention does not impose a specific limitation thereto.

Exemplarily, if the length of the first discovery signal before the first discovery signal is encoded is 768 bits, and an encoding rule is that one information bit generates two check bits during encoding, according to the length of the first discovery signal before the first discovery signal is encoded, it is determined that the length of the first discovery signal after the first discovery signal is encoded is 768*3=2304 bits. Then, with reference to FIG. 1, 288-bit data of a discovery signal can be transmitted on one PRB Pair. Therefore, it may be determined that the following quantity of PRB Pairs are required for all coded bits of the first discovery signal:

N=2304 bits/288 bits=8.

It is assumed that four RVs may be obtained after the first discovery signal is encoded. Then, a quantity of PRB Pairs occupied by any RV of the first discovery signal may be determined: n=[N/k]=[8/4]=2, where N represents a quantity of PRB Pairs required for all coded bits of the first discovery signal, k represents a quantity of RVs of the first discovery signal that are obtained after the first discovery signal is encoded, and [ ] represents rounding right.

It should be noted that, when N/k is an integer, a minimum value, of a quantity n of PRB Pairs occupied by any RV of the first discovery signal, obtained by using the foregoing formula is a quantity of PRB Pairs on which all coded bits of all RVs of the first discovery signal can be transmitted exactly. Certainly, in consideration of the need of redundancy when an RV is being sent, the quantity n may increase slightly, that is, the quantity may increase by some coefficients, for example, n=[N/k]+1, where n=3, and this embodiment of the present invention does not impose a specific limitation thereto.

Certainly, the above merely exemplarily provides a method for determining, by the UE according to the length of the first discovery signal, a quantity n of PRB Pairs occupied by any RV of the first discovery signal. Certainly, there may also be another possible implementation manner. For example, the UE stores a correspondence shown in Table 2A. If the length of the first discovery signal after the first discovery signal is encoded is 2304 bits, according to the correspondence shown in Table 2, it can be determined that the quantity n of PRB Pairs occupied by any RV of the first discovery signal is 2. This embodiment of the present invention does not impose a specific limitation on the method for determining, by the UE according to the length of the first discovery signal, a quantity n of PRB Pairs occupied by any RV of the first discovery signal.

TABLE 2

| Length (bit) of an encoded first discovery signal | Quantity (n) of PRB Pairs |
| --- | --- |
| 0-767 | 1 |
| 768-1535 | 1 |
| 1536-2303 | 1 |
| 2304-3071 | 2 |

Certainly, the UE may also store a correspondence between the length of the first discovery signal before the first discovery signal is encoded and a quantity n of PRB Pairs occupied by any RV of the first discovery signal. If the length of the first discovery signal is the length of the first discovery signal before the first discovery signal is encoded, the UE may directly determine, according to the correspondence, the corresponding quantity n of PRB Pairs occupied by any RV of the first discovery signal. This embodiment of the present invention does not impose a specific limitation thereto.

In addition, in the process of determining the first discovery signal, after determining, according to the length of the first discovery signal, the quantity n of PRB Pairs occupied by any RV of the first discovery signal, the UE further configures first indication information in the first discovery signal, where the first indication information is used to indicate a quantity j of PRB Pairs occupied by the first discovery signal, j is equal to a value obtained by multiplying n by f, and f is a quantity of RVs sent by the UE in the first resource. In this way, when the UE receiving the discovery signal is performing detection on the received discovery signal, complexity of receiving and detection may be reduced.

Specifically, as described below, in this embodiment of the present invention, discovery signals occupying different quantities of PRB Pairs may be transmitted in a process of transmitting the discovery signals, for example, currently a discovery signal occupying j1 PRB Pairs may be transmitted, or a discovery signal occupying j2 PRB Pairs may be transmitted, where j1<j2; therefore, at a first resource location, the discovery signal occupying j1 PRB Pairs may be carried, or the part of j1 PRB Pairs of the discovery signal occupying j2 PRB Pairs may be carried. The UE receiving the discovery signal detects whether a discovery signal is included at the first resource location, where the discovery signal may be a discovery signal occupying transmission resources of j1 PRB Pairs or may be a discovery signal occupying transmission resources of j2 PRB Pairs. If the UE configures, in the first discovery signal, first indication information that indicates a quantity j of PRB Pairs occupied by the first discovery signal, if the UE receiving the discovery signal detects, at the first resource location, a first discovery signal sent at a second resource location, the UE does not need to detect a discovery signal at the second resource location or at another first resource location that overlaps the second resource location, which can reduce complexity of detecting a discovery signal by second UE. The first resource location includes j1 PRB Pairs and m1 subframes, where j1≥m1, and the second resource location includes j2 PRB Pairs and m2 subframes, where j2≥m2.

Exemplarily, it is assumed that currently a discovery signal occupying one PRB Pair may be transmitted or a discovery signal occupying two PRB Pairs may be transmitted. When the UE receiving the discovery signal performs detection at (PRB 1, subframe 1), in the PRB Pair, the discovery signal occupying one PRB Pair may be carried, or one PRB Pair of the two PRB Pairs of the discovery signal occupying 2 PRB Pairs may be carried. Then, if a data packet is parsed according to a sending rule, the UE receiving the discovery signal needs to detect once whether a discovery signal is included at (PRB 1, subframe 1), detect once whether a discovery signal is included at (PRB 1, subframe 2), and detect once whether a discovery signal is included at (PRB 1, subframe 1) and (PRB 1, subframe 2), that is, for the two PRB Pairs, the UE needs to perform detection for a discovery signal for three times. However, when the solutions provided in this embodiment of the present invention are used, after detecting a first discovery signal at (PRB 1, subframe 1), the UE receiving the discovery signal finds that the first discovery signal occupies two PRB Pairs, and therefore, the UE receiving the discovery signal can determine that another RV of the first discovery signal, but not another discovery signal, is carried at (PRB 1, subframe 2). In this case, the UE receiving the discovery signal does not need to detect whether a discovery signal is included at (PRB 1, subframe 2), and also does not need to detect whether a discovery signal is included at (PRB 1, subframe 1) and (PRB 1, subframe 2), that is, in the two PRB Pairs and subframes, the UE needs to perform detection for a discovery signal only once, and therefore, complexity of receiving a discovery signal by the UE receiving the discovery signal can be reduced.

502. The UE obtains, after encoding the first discovery signal, respective initial locations of k RVs of the first discovery signal, where k is a positive integer not less than 1.

Specifically, after determining the first discovery signal, the UE encodes the first discovery signal. This embodiment of the present invention does not impose a specific limitation on a specific encoding scheme and a specific encoding rule.

After the first discovery signal is encoded, the respective initial locations of the k RVs can be obtained, where k is a positive integer not less than 1.

Exemplarily, if an encoding scheme depicted in FIG. 2 is used, one information bit generates two check bits, and respective initial locations of four RVs shown in FIG. 2 can be obtained after the encoding, where k=4.

503. The UE separately maps, according to respective initial locations off f RVs of the k RVs, each RV of the f RVs to at least two PRB Pairs of a first resource location, where f is a positive integer not less than 1 and not greater than k.

Specifically, the first resource location may be a resource location using a fixed structure in the existing, for example, two PRB Pairs or four PRB Pairs are used regularly.

Preferably, composition of a discovery signal is not always the same. For example, a discovery signal may include four parts: the first part is a network parameter, including mobile service country code (MCC) or the like, the second part is a proximity service parameter, including a proximity service server identity (ProSe Server Identity; ProSe Server ID) or the like, the third part is an application parameter, including an application identity or the like, and the fourth part is a UE parameter, including a UE identity or the like. In content of the foregoing four parts, different applications may correspond to different quantities of UE, or different quantities of UE may be used at different stages even for a same application; therefore, a total length of the discovery signal is a variable value. However, it is likely to cause system resource waste or resource insufficiency when the discovery signal is still sent by using a fixed structure in a case in which the total length of the discovery signal is variable. Therefore, the first resource location may be one of h resource locations including j PRB Pairs and m subframes, where m is a positive integer not less than 1, j≥m, h is a positive integer greater than 1, and the h resource locations do not overlap.

That is, when sending the first discovery signal at a physical layer, the UE may determine a transmission structure according to an actual size of the first discovery signal. Exemplarily, if the respective initial locations of the k (for example, k=4) RVs are obtained after the first discovery signal is encoded, and each RV includes data resources corresponding to two PRB Pairs, in an actual transmission process, RVs of the first discovery signal are sent according to a transmission rule depicted in FIG. 2, and a receive end performs correct decoding after two RVs are sent and instructs a transmit end to send new data. In this process, the UE respectively maps, according to respective initial locations of RV0 and RV1, the RV0 and the RV1 to two PRB Pairs of the first resource location, where the first resource location corresponds to n*f=2*2 PRB Pairs, n represents a quantity of PRB Pairs occupied by any RV of the first discovery signal, and f represents a quantity of actually transmitted RVs of the first discovery signal. If the first discovery signal is sent by using a fixed structure of six PRB Pairs in the prior art, the first resource location provided in this embodiment of the present invention can save a system resource; if the first discovery signal is sent by using a fixed structure of two PRB Pairs in the prior art, the first resource location provided in this embodiment of the present invention enables the first discovery signal to be transmitted completely.

Therefore, the first resource location of a variable structure provided in this embodiment of the present invention enables system resources to be utilized properly, without causing resource waste or resource inefficiency.

It should be noted that, because one subframe may include multiple PRB Pairs, the quantity j of PRB Pairs that may correspond to the first resource location is greater than or equal to the quantity m of subframes.

Exemplarily, if m=2 and j=4, it indicates that the first resource location is a resource location including four PRB Pairs and two subframes, where each subframe may include two PRB Pairs.

It should be noted that, when the h first resource locations including j PRB Pairs and m subframes are being configured, if the h resource locations do not overlap, resource overlapping can be prevented when resource mapping is performed for different first discovery signals, and then interference between the signals can be reduced.

Further, in the h resource locations, a number of the first PRB Pair at the latter resource location of adjacent resource locations is 1 plus a number of the last PRB pair at the former resource location, a sequence of the h resource locations is determined first according to a frequency domain and then according to a time domain, and numbers of PRB Pairs at each resource location are successive.

In another possible implementation manner, in the h resource locations, a number of the first PRB Pair at the latter resource location of adjacent resource locations is 1 plus a number of the last PRB pair at the former resource location, a sequence of the h resource locations is determined first according to a time domain and then according to a frequency domain, and numbers of PRB Pairs at each resource location are successive.

Figure 6:
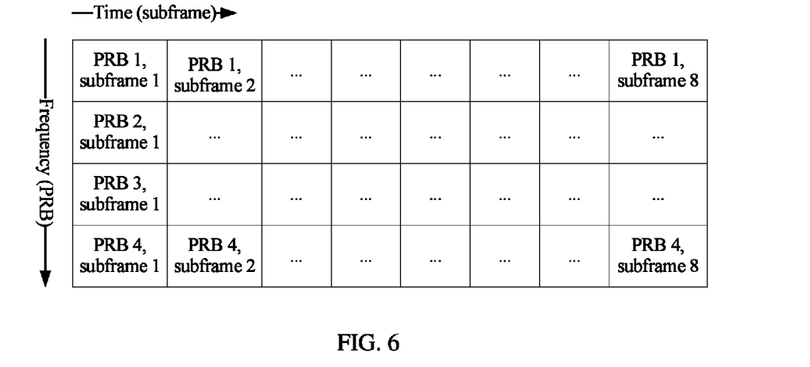
FIG. 6 is a schematic diagram of a type of resource pool division according to an embodiment of the present invention.

Specifically, in a process of dividing a resource pool, each PRB Pair in a resource may be first numbered according to a resource pool division rule. Exemplarily, FIG. 6 is a resource pool with four PRBs in a frequency domain and eight subframes in a time domain. If the resource pool is divided according to a big rule of first according to a frequency domain and then according to a time domain, (PRB 1, subframe 1) may be numbered 1, (PRB 2, subframe 1) may be numbered 2, (PRB 3, subframe 1) may be numbered 3, (PRB 4, subframe 1) may be numbered 4, (PRB 1, subframe 2) may be numbered 5, . . . , and so on, and the last (PRB 4, subframe 8) may be numbered 32; or, if the resource pool is divided according to a big rule of first according to a time domain and then according to a frequency domain, (PRB 1, subframe 1) may be numbered 1, (PRB 1, subframe 2) may be numbered 2, (PRB 1, subframe 3) may be numbered 3, (PRB 1, subframe 4) may be numbered 4, . . . , (PRB 2, subframe 1) may be numbered 9, . . . , and so on, and the last (PRB 4, subframe 8) may be numbered 32.

If j=1, in the resource pool shown in FIG. 6, a discovery signal may be placed in all four PRB Pairs of each subframe, and a total of 4*8=32 discovery signals with each occupying one PRB Pair may be placed.

If j=2, in the h resource locations, a number of the first PRB Pair at the latter resource location of adjacent resource locations is 1 plus a number of the last PRB pair at the former resource location, a sequence of the h resource locations is determined first according to a frequency domain and then according to a time domain, and numbers of PRB Pairs at each resource location are successive. Then, a resource pool division situation shown in FIG. 7 may be obtained. In this case, the first resource location is one of 16 resource locations with each including two PRB Pairs and one subframe. If the first discovery signal occupies two PRB Pairs, in a resource shown in FIG. 7, the first discovery signal may be placed in two PRB Pairs of one subframe. For example, in FIG. 7, the first discovery signal may be placed at (PRB 1, subframe 1) and (PRB 2, subframe 1), the first discovery signal may be placed at (PRB 3, subframe 1) and (PRB 4, subframe 1), and in this case, two resource blocks, that is, (PRB 1, subframe 1) and (PRB 2, subframe 1), and (PRB 3, subframe 1) and (PRB 4, subframe 1) do not overlap. If it is configured that a discovery signal may be placed at (PRB 1, subframe 1) and (PRB 2, subframe 1), a discovery signal cannot be placed at (PRB 2, subframe 1) and (PRB 3, subframe 1), because resources overlap.

If j=2, in the h resource locations, a number of the first PRB Pair at the latter resource location of adjacent resource locations is 1 plus a number of the last PRB pair at the former resource location, a sequence of the h resource locations is determined first according to a time domain and then according to a frequency domain, and numbers of PRB Pairs at each resource location are successive. Then, a resource pool division situation shown in FIG. 8 may be obtained. In this case, the first resource location is one resource location of 16 resource locations each including two PRB Pairs and two subframes. If the first discovery signal occupies two PRB Pairs, in a resource shown in FIG. 8, the first discovery signal may be placed in two PRB Pairs of two subframes, and resources on which the discovery signal is placed should not overlap. For example, in FIG. 8, the first discovery signal may be placed at (PRB 1, subframe 1) and (PRB 1, subframe 2), the first discovery signal may be placed at (PRB 1, subframe 3) and (PRB 1, subframe 4), and in this case, two resource blocks, that is, (PRB 1, subframe 1) and (PRB 1, subframe 2), and (PRB 1, subframe 3) and (PRB 1, subframe 4) do not overlap. If it is configured that a discovery signal may be placed at (PRB 1, subframe 1) and (PRB 1, subframe 2), a discovery signal cannot be placed at (PRB 1, subframe 2) and (PRB 1, subframe 3), because resources overlap. Likewise, if the first discovery signal needs to occupy more PRB Pairs, the discovery signal may be placed in multiple PRB Pairs of one subframe, or multiple PRB Pairs of multiple subframes, and this embodiment of the present invention does not impose a specific limitation thereto.

It should be noted that the foregoing two possible implementation manners are merely two possible resource pool division situations that are exemplarily provided. Certainly, there may be another resource pool division manner, for example, a division situation in which two resource locations are enabled not to be closely adjacent, but are offset by an amount. This embodiment of the present invention does not impose a specific limitation on a resource pool division situation, but imposes a limitation that the h resource locations do not overlap.

Specifically, that the UE separately maps, according to respective initial locations of f RVs of the k RVs, each RV of the f RVs to at least two PRB Pairs of the first resource location includes: the UE separately maps, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a frequency domain and then according to a time domain.

Figure 8:
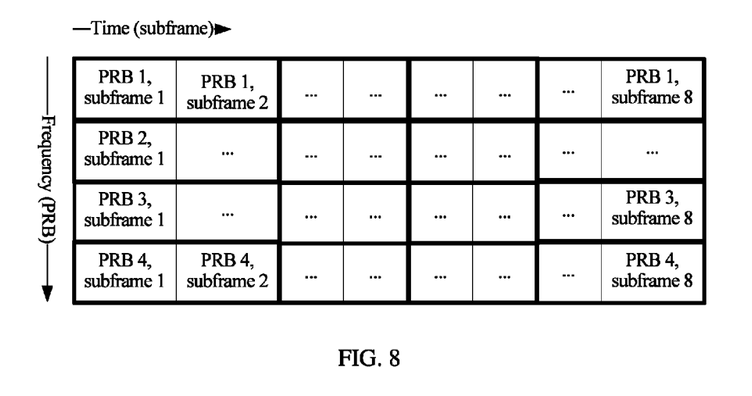
FIG. 8 is a schematic diagram of still another type of resource pool division according to an embodiment of the present invention.
Figure 9:
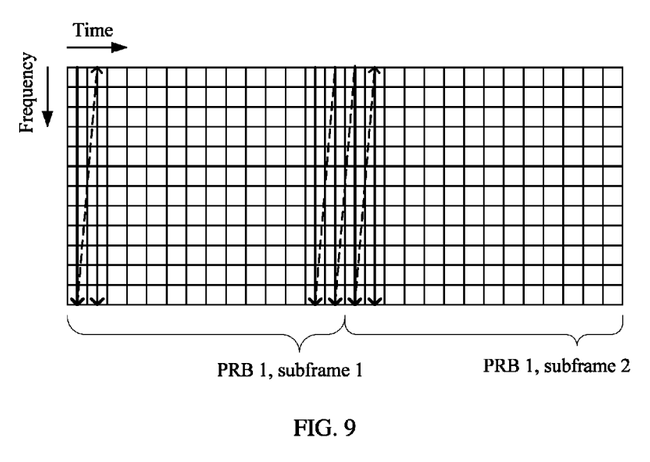
FIG. 9 is a schematic diagram of transmission data mapping of a first discovery signal according to an embodiment of the present invention.

Exemplarily, if the first resource location is a location corresponding to (PRB 1, subframe 1) and (PRB 1, subframe 2) shown in FIG. 8, when an RV0 of the first discovery signal is being mapped to each PRB Pair of (PRB 1, subframe 1) and (PRB 1, subframe 2), the mapping may be performed in each PRB Pair first according to a frequency domain and then according to a time domain, that is, when transmission data of the RV0 of the first discovery signal is being mapped, data is placed at (PRB 1, subframe 1) sequentially by using a method for first performing mapping according to a frequency domain and then performing mapping according to a time domain. When the mapping to (PRB 1, subframe 1) is complete, data is placed at (PRB 1, subframe 2) sequentially still by using the method for first performing mapping according to a frequency domain and then performing mapping according to a time domain. With reference to a schematic diagram of composition of one PRB Pair depicted in FIG. 1, a mapping result depicted in FIG. 9 may be obtained.

Certainly, a mapping method for multiple PRB Pairs of multiple subframes is similar to a mapping method for two PRB Pairs of two subframes, and is not described in detail in this embodiment of the present invention.

Optionally, that the UE separately maps, according to respective initial locations of f RVs of the k RVs, each RV of the f RVs to at least two physical resource block pairs PRB Pairs of the first resource location includes: the UE separately maps, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a time domain and then according to a frequency domain.

Figure 10:
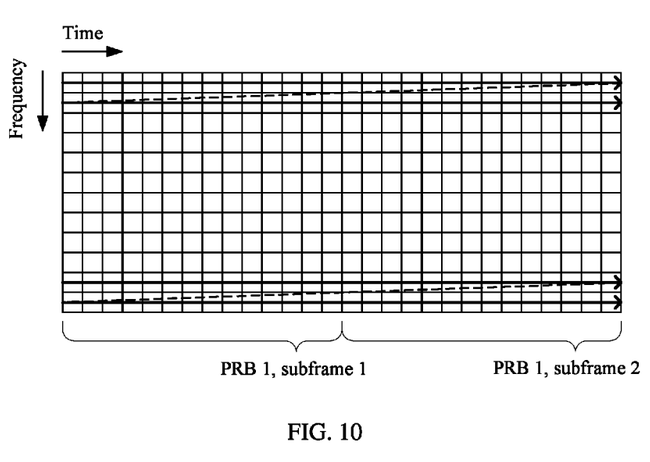
FIG. 10 is a schematic diagram of transmission data mapping of another first discovery signal according to an embodiment of the present invention.

Exemplarily, if the first resource location is a location corresponding to (PRB 1, subframe 1) and (PRB 1, subframe 2) shown in FIG. 8, when an RV0 of the first discovery signal is being mapped to each PRB Pair of (PRB 1, subframe 1) and (PRB 1, subframe 2), the mapping may be performed in each PRB Pair first according to a time domain and then according to a frequency domain, that is, when transmission data of the RV0 of the first discovery signal is being mapped, data is placed at (PRB Pair 1, subframe 1) sequentially by using a method for first performing mapping according to a time domain and then performing mapping according to a frequency domain. When the mapping to (PRB 1, subframe 1) is complete, data is placed at (PRB 1, subframe 2) sequentially still by using the method for first performing mapping according to a time domain and then performing mapping according to a frequency domain. With reference to a schematic diagram of composition of one PRB Pair depicted in FIG. 1, a mapping result depicted in FIG. 10 may be obtained.

Certainly, a mapping method for multiple PRB Pairs of multiple subframes is similar to a mapping method for two PRB Pairs of two subframes, and is not described in detail in this embodiment of the present invention.

Figure 7:
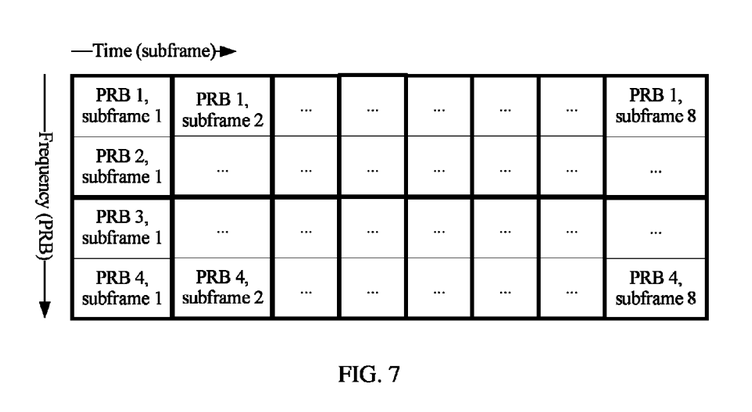
FIG. 7 is a schematic diagram of another type of resource pool division according to an embodiment of the present invention.

It should be noted that, in the schematic diagrams of resource pool division shown in FIG. 6 to FIG. 8, each small grid represents one PRB Pair, each PRB Pair is jointly formed by one PRB and one subframe. For example, (PRB 1, subframe 1) represents a PRB Pair whose frequency resource is PRB 1, and time resource is subframe 1.

It should be noted that, it can be learned with reference to the description of the RV part that, when an RV redundancy version is an RV0 (it is assumed that the transmission is the first time of transmission), a relatively large quantity of system bits are transmitted. After the receive end fails in this time of decoding, the receive end instructs the transmit end to perform the first time of retransmission (it is assumed that the RV is an RV1), and in this way, more new redundancy bits are transmitted. The receive end does not discard data during a decoding failure at a previous time, but performs further decoding with reference to a retransmitted new redundancy bit. If an error still occurs, the receive end continues to instruct the transmit end to perform the second time of retransmission (it is assumed that the RV is an RV2), and more new redundancy bits are transferred. Likewise, if an error still occurs, the receive end continues to instruct the transmit end to perform the third time of retransmission (it is assumed that the RV is an RV3), and more new redundancy bits are transferred. If the receive end performs correct decoding, the receive end may instruct the transmit end to send new data, and in this case, may continue to transmit another RV of the first discovery signal. Therefore, although K RVs are obtained after the first discovery signal is encoded, it is not necessary to send all the k RVs during actual transmission, and f RVs of the first discovery signal are transmitted at the first resource location, where 1≤f≤k and f is a positive integer. Then, the UE separately maps, according to the respective initial locations of the f RVs of the k RVs, each RV of the f RVs to the at least two physical resource block pairs PRB Pairs of the first resource location, where 1≤f≤k and f is a positive integer.

Exemplarily, if f=2 and k=4, the UE actually separately maps two RVs of four RVs to at least two PRB Pairs of the first resource location.

504. The UE transmits, at the first resource location, the f RVs of the first discovery signal.

Specifically, after the UE separately maps, according to the respective initial locations of the f RVs of the k RVs, each RV of the f RVs to the at least two physical resource block pairs PRB Pairs of the first resource location, the UE transmits, at the first resource location, the f RVs of the first discovery signal.

Exemplarily, it is assumed that PRB Pairs included at the first resource location are (PRB 1, subframe 1), (PRB 1, subframe 2), (PRB 1, subframe 3), and (PRB 1, subframe 4). After mapping an RV0 of the first discovery signal to (PRB 1, subframe 1) and (PRB 1, subframe 2), the UE may send the RV0 of the first discovery signal at corresponding (PRB 1, subframe 1) and (PRB 1, subframe 2) of the first resource location, and after mapping an RV1 of the first discovery signal to (PRB 1, subframe 3) and (PRB 1, subframe 4), the UE may send the RV1 of the first discovery signal at corresponding (PRB 1, subframe 3) and (PRB 1, subframe 4) of the first resource location.

Based on the foregoing solution provided in this embodiment of the present invention, after determining a first discovery signal and encoding the first discovery signal to obtain respective initial locations of k redundancy versions RVs of the first discovery signal, the UE can further separately map, according to respective initial locations off RVs of the k RVs, each RV of the f RVs to at least two physical resource block pairs PRB Pairs of a first resource location, and therefore, a problem in the prior art that encoding performance deteriorates because each RV can be transmitted on only one PRB Pair can be resolved, and the encoding performance is improved.

Embodiment 2

Figure 11:
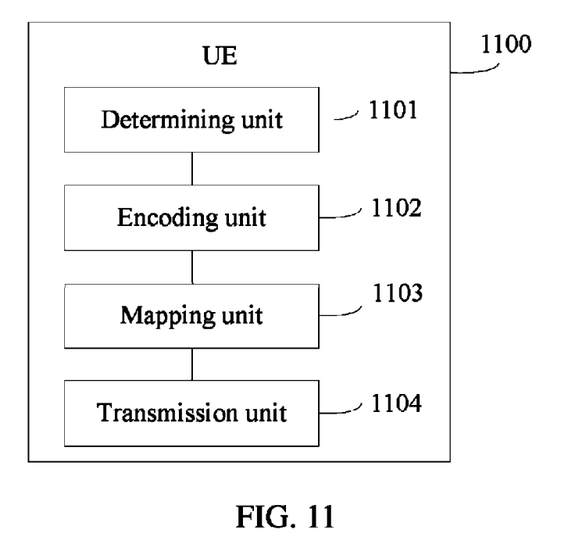
FIG. 11 is a schematic structural diagram of a type of UE according to an embodiment of the present invention.

This embodiment of the present invention provides UE 1100. Specifically, as shown in FIG. 11, the UE 1100 includes a determining unit 1101, an encoding unit 1102, a mapping unit 1103, and a transmission unit 1104.

The determining unit 1101 is configured to determine a first discovery signal.

The encoding unit 1102 is configured to encode the first discovery signal determined by the determining unit 1101, so as to obtain respective initial locations of k redundancy versions RVs of the first discovery signal, where k is a positive integer not less than 1.

The mapping unit 1103 is configured to separately map, according to respective initial locations off RVs of the k RVs that are obtained by the encoding unit 1102, each RV of the f RVs to at least two physical resource block pairs PRB Pairs of a first resource location, where f is a positive integer not less than 1 and not greater than k.

The transmission unit 1104 is configured to transmit, at the first resource location, the f RVs of the first discovery signal.

Specifically, the first resource location is one of h resource locations including j PRB Pairs and m subframes, where m is a positive integer not less than 1, j≥m, h is a positive integer greater than 1, and the h resource locations do not overlap.

In a possible implementation manner, in the h resource locations, a number of the first PRB Pair at the latter resource location of adjacent resource locations is 1 plus a number of the last PRB pair at the former resource location, a sequence of the h resource locations is determined first according to a frequency domain and then according to a time domain, and numbers of PRB Pairs at each resource location are successive.

In another possible implementation manner, in the h resource locations, a number of the first PRB Pair at the latter resource location of adjacent resource locations is 1 plus a number of the last PRB pair at the former resource location, a sequence of the h resource locations is determined first according to a time domain and then according to a frequency domain, and numbers of PRB Pairs at each resource location are successive.

Further, the determining unit 1101 is specifically configured to: determine a length of the first discovery signal; determine, according to the length of the first discovery signal, that any RV of the first discovery signal occupies n PRB Pairs, where n is a positive integer not less than 2; and configure first indication information in the first discovery signal, where the first indication information is used to indicate a quantity j of PRB Pairs occupied by the first discovery signal, j is equal to a value obtained by multiplying n by f, and f is a quantity of RVs sent by the UE in the first resource.

Further, the mapping unit 1103 is specifically configured to: separately map, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a frequency domain and then according to a time domain.

Optionally, the mapping unit 1103 is specifically configured to: separately map, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a time domain and then according to a frequency domain.

Specifically, for a method for transmitting a discovery signal by the UE, refer to related description in Embodiment 1, and details are not described in this embodiment of the present invention again.

According to the UE provided in this embodiment of the present invention, a problem in the prior art that encoding performance deteriorates because each RV can be transmitted on only one PRB Pair can be resolved, and the encoding performance is improved.

Embodiment 3

Figure 12:
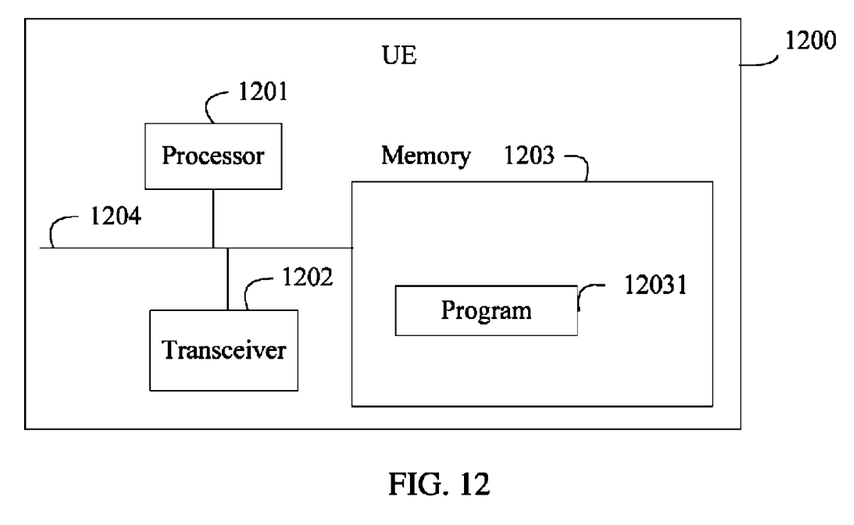
FIG. 12 is a schematic structural diagram of another type of UE according to an embodiment of the present invention.

This embodiment of the present invention provides UE 1200. As shown in FIG. 12, the UE 1200 includes a processor 1201, a transceiver 1202, a memory 1203, and a communications bus 1204.

The communications bus 1204 is configured for connection and communication among the processor 1201, the transceiver 1202, and the memory 1203.

The transceiver 1202 is configured for communication between the UE 1200 and the outside.

The processor 1201 is configured to invoke program code 12031 stored in the memory 1203 to perform the following operations: determining a first discovery signal; obtaining, after encoding the first discovery signal, respective initial locations of k redundancy versions RVs of the first discovery signal, where k is a positive integer not less than 1; separately mapping, according to respective initial locations off RVs of the k RVs, each RV of the f RVs to at least two physical resource block pairs PRB Pairs of a first resource location, where f is a positive integer not less than 1 and not greater than k; and transmitting, at the first resource location, the f RVs of the first discovery signal.

Specifically, the first resource location is one of h resource locations including j PRB Pairs and m subframes, where m is a positive integer not less than 1, j≥m, h is a positive integer greater than 1, and the h resource locations do not overlap.

In a possible implementation manner, in the h resource locations, a number of the first PRB Pair at the latter resource location of adjacent resource locations is 1 plus a number of the last PRB pair at the former resource location, a sequence of the h resource locations is determined first according to a frequency domain and then according to a time domain, and numbers of PRB Pairs at each resource location are successive.

In another possible implementation manner, in the h resource locations, a number of the first PRB Pair at the latter resource location of adjacent resource locations is 1 plus a number of the last PRB pair at the former resource location, a sequence of the h resource locations is determined first according to a time domain and then according to a frequency domain, and numbers of PRB Pairs at each resource location are successive.

Further, the determining a first discovery signal includes: determining a length of the first discovery signal; determining, according to the length of the first discovery signal, that any RV of the first discovery signal occupies n PRB Pairs, where n is a positive integer not less than 2; and configuring first indication information in the first discovery signal, where the first indication information is used to indicate a quantity j of PRB Pairs occupied by the first discovery signal, j is equal to a value obtained by multiplying n by f, and f is a quantity of RVs sent by the UE in the first resource.

Further, the separately mapping, according to respective initial locations off RVs of the k RVs, each RV of the f RVs to at least two physical resource block pairs PRB Pairs of a first resource location includes: separately mapping, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a frequency domain and then according to a time domain.

Optionally, the separately mapping, according to respective initial locations off f RVs of the k RVs, each RV of the f RVs to at least two physical resource block pairs PRB Pairs of a first resource location includes: separately mapping, according to the respective initial locations of the f RVs of the k RVs, each RV of the f RVs to the at least two physical resource block pairs PRB Pairs of the first resource location, where a sequence of mapping each RV of the f RVs to the at least two PRB Pairs is determined first according to a time domain and then according to a frequency domain.

The memory 1403 may include a high-speed random access memory (Random Access Memory, RAM), or may include a non-volatile memory (non-volatile memory), for example, at least one magnetic disk storage, and this embodiment of the present invention does not impose a specific limitation thereto.

Specifically, for a method for transmitting a sending signal by the UE, refer to description in Embodiment 1, and details are not described in this embodiment of the present invention again.

According to the UE provided in this embodiment of the present invention, a problem in the prior art that encoding performance deteriorates because each RV can be transmitted on only one PRB Pair can be resolved, and the encoding performance is improved.

It may be clearly understood by a person skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    determining, by a device, a first discovery signal;
    obtaining, by the device after encoding the first discovery signal, respective initial locations of k redundancy versions (RVs) of the first discovery signal, wherein k is a positive integer not less than 1;
    separately mapping, by the device according to respective initial locations off RVs of the k RVs, each RV of the f RVs to a plurality of physical resource block pairs (PRB pairs) of a first resource location, wherein f is a positive integer not less than 1 and not greater than k; and
    transmitting, by the device at the first resource location, the f RVs of the first discovery signal.

2. The method according to claim 1, wherein determining the first discovery signal comprises:
    determining, by the device, a length of the first discovery signal;
    determining, by the device according to the length of the first discovery signal, that an RV of the first discovery signal occupies n PRB pairs, wherein n is a positive integer not less than 2; and
    configuring, by the device, first indication information in the first discovery signal, wherein the first indication information indicates a quantity j of PRB Pairs occupied by the first discovery signal, j is equal to a value obtained by multiplying n by f, and f is a quantity of RVs sent by the device in the first resource.

3. The method according to claim 1, wherein:
    the first resource location is one of h resource locations comprising j PRB pairs and m subframes, wherein m is a positive integer not less than 1, j is a positive integer greater than 1, j≥m, h is a positive integer greater than 1, and the h resource locations do not overlap.

4. The method according to claim 3, wherein in the h resource locations, a number of a first PRB pair at a latter resource location of adjacent resource locations is 1 plus a number of a last PRB pair at a former resource location, a sequence of the h resource locations is determined first according to a frequency domain and then according to a time domain, and numbers of PRB pairs at each resource location are successive.

5. The method according to claim 3, wherein in the h resource locations, a number of a first PRB pair at a latter resource location of adjacent resource locations is 1 plus a number of a last PRB pair at a former resource location, a sequence of the h resource locations is determined first according to a time domain and then according to a frequency domain, and numbers of PRB pairs at each resource location are successive.

6. The method according to claim 1, wherein separately mapping each RV of the f RVs to the plurality physical resource block pairs (PRB pairs) of the first resource location comprises:
    separately mapping, by the device according to the respective initial locations of the f RVs of the k RVs, each RV of the f RVs to the plurality of PRB pairs of the first resource location, wherein a sequence of mapping each RV of the f RVs to the plurality of PRB pairs is determined first according to a frequency domain and then according to a time domain.

7. The method according to claim 1, wherein separately mapping each RV of the f RVs to the plurality of physical resource block pairs (PRB pairs) of the first resource location comprises:
    separately mapping, by the device according to the respective initial locations of the f RVs of the k RVs, each RV of the f RVs to the plurality of physical resource block pairs (PRB pairs) of the first resource location, wherein a sequence of mapping each RV of the f RVs to the plurality of PRB pairs is determined first according to a time domain and then according to a frequency domain.

8. A device, comprising:
    a processor;
    a transceiver;
    a memory; and
    a communications bus;
    wherein the communications bus is configured for connection and communication among the processor, the transceiver, and the memory;
    wherein the transceiver is configured to enable external communication by the device; and
    wherein the memory comprises computer program code, where the memory and the computer program code are configured, with the processor, to cause the device to:
        determine a first discovery signal;
        encode the first discovery signal to obtain respective initial locations of k redundancy versions (RVs) of the first discovery signal, wherein k is a positive integer not less than 1;
        separately map, according to respective initial locations off RVs of the k RVs, each RV of the f RVs to a plurality of physical resource block pairs (PRB pairs) of a first resource location, wherein f is a positive integer not less than 1 and not greater than k; and
        transmit, at the first resource location, the f RVs of the first discovery signal.

9. The device according to claim 8, wherein the memory and the computer program code are further configured, with the processor, to cause the device to:
- determine a length of the first discovery signal;
- determine, according to the length of the first discovery signal, that an RV of the first discovery signal occupies n PRB pairs, wherein n is a positive integer not less than 2; and
- configure first indication information in the first discovery signal, wherein the first indication information indicates a quantity j of PRB Pairs occupied by the first discovery signal, j is equal to a value obtained by multiplying n by f, and f is a quantity of RVs sent by the device in the first resource.

10. The device according to claim 9, wherein in h resource locations, a number of a first PRB pair at a latter resource location of adjacent resource locations is 1 plus a number of a last PRB pair at a former resource location, a sequence of the h resource locations is determined first according to a frequency domain and then according to a time domain, and numbers of PRB pairs at each resource location are successive.

11. The device according to claim 9, wherein in h resource locations, a number of a first PRB pair at a latter resource location of adjacent resource locations is 1 plus a number of a last PRB pair at a former resource location, a sequence of the h resource locations is determined first according to a time domain and then according to a frequency domain, and numbers of PRB pairs at each resource location are successive.

12. The device according to claim 8, wherein the first resource location is one of h resource locations comprising j PRB pairs and m subframes, wherein m is a positive integer not less than 1, j≥m, h is a positive integer greater than 1, and the h resource locations do not overlap.

13. The device according to claim 8, wherein the memory and the computer program code are further configured, with the processor, to cause the device to:
- separately map, according to the respective initial locations of the f RVs of the k RVs, each RV of the f RVs to the plurality of physical resource block pairs (PRB pairs) of the first resource location, wherein a sequence of mapping each RV of the f RVs to the plurality of PRB pairs is determined first according to a frequency domain and then according to a time domain.

14. The device according to claim 8, wherein the memory and the computer program code are further configured, with the processor, to cause the device to:
- separately map, according to the respective initial locations of the f RVs of the k RVs, each RV of the f RVs to the plurality of physical resource block pairs (PRB pairs) of the first resource location, wherein a sequence of mapping each RV of the f RVs to the plurality of PRB pairs is determined first according to a time domain and then according to a frequency domain.

15. A device, comprising:
- means for determining a first discovery signal;
- means for encoding the first discovery signal to obtain respective initial locations of k redundancy versions (RVs) of the first discovery signal, wherein k is a positive integer not less than 1;
- means for separately mapping, according to respective initial locations off RVs of the k RVs, each RV of the f RVs to a plurality of physical resource block pairs (PRB pairs) of a first resource location, wherein f is a positive integer not less than 1 and not greater than k; and
- means for transmitting, at the first resource location, the f RVs of the first discovery signal.

16. The device according to claim 15, further comprising:
- means for determining a length of the first discovery signal;
- means for determining, according to the length of the first discovery signal, that an RV of the first discovery signal occupies n PRB pairs, wherein n is a positive integer not less than 2; and
- means for configuring first indication information in the first discovery signal, wherein the first indication information indicates a quantity j of PRB Pairs occupied by the first discovery signal, j is equal to a value obtained by multiplying n by f, and f is a quantity of RVs sent by the device in the first resource.

* * * * *

UNITED STATES PATENT AND TRADEMARK OFFICE
CERTIFICATE OF CORRECTION

PATENT NO.         : 9,973,917 B2
APPLICATION NO.    : 15/114249
DATED              : May 15, 2018
INVENTOR(S)        : Jian Wang Page 1 of 1

It is certified that error appears in the above-identified patent and that said Letters Patent is hereby corrected as shown below:

In the Claims

In Column 17, Line 43, Claim 1, delete "initial locations off RVs" and insert --initial locations of f RVs--.

In Column 18, Line 61-62, Claim 8, delete "initial locations off RVs" and insert --initial locations of f RVs--.

Signed and Sealed this
Twenty-eighth Day of August, 2018

Andrei Iancu
*Director of the United States Patent and Trademark Office*